US008544579B2

(12) United States Patent
Kabrick et al.

(10) Patent No.: US 8,544,579 B2

(45) Date of Patent: Oct. 1, 2013

(54) AXLE ASSEMBLY FOR ELECTRIC DRIVE MACHINE

(75) Inventors: Keith Kabrick, Springfield, IL (US); John Zeirke, Decatur, IL (US); Thomas J. Gregg, Decatur, IL (US); David M. White, Decatur, IL (US); Gopala K. Gorle, Decatur, IL (US); Jie Tu, Clarendon Hills, IL (US)

(73) Assignee: Caterpillar Inc., Peoria, IL (US)

( * ) Notice: Subject to any disclaimer, the term of this patent is extended or adjusted under 35 U.S.C. 154(b) by 1292 days.

(21) Appl. No.: 12/152,172

(22) Filed: May 13, 2008

(65) Prior Publication Data

US 2009/0283345 A1 Nov. 19, 2009

(51) Int. Cl.
*B60K 7/00* (2006.01)

(52) U.S. Cl.
USPC ........................................................ 180/65.51

(58) Field of Classification Search
USPC ................ 180/65.51, 65.6, 55, 56, 58, 60, 62
See application file for complete search history.

(56) References Cited

U.S. PATENT DOCUMENTS

| | | | | |
|---|---|---|---|---|
| 1,366,325 | A | | 1/1921 | Perin |
| 2,182,743 | A | | 12/1939 | Clergy |
| 2,264,785 | A | | 12/1941 | Ash |
| 2,529,330 | A | | 11/1950 | Double |
| 2,543,811 | A | | 3/1951 | Snow et al. |
| 2,654,147 | A | | 10/1953 | Wilson et al. |
| 2,885,165 | A | | 5/1959 | Smolen |
| 3,157,239 | A | | 11/1964 | Bemotas |
| 3,184,994 | A | | 5/1965 | Stahl |
| 3,365,986 | A | | 1/1968 | Mazziotti |
| 3,387,502 | A | | 6/1968 | Tourneau |
| 3,452,612 | A | | 7/1969 | Casey |
| 3,459,070 | A | | 8/1969 | Holdeman |
| 3,737,000 | A | | 6/1973 | Knobloch et al. |
| 3,756,095 | A | | 9/1973 | McCay, Jr. et al. |
| 3,770,074 | A | * | 11/1973 | Sherman ..................... 180/65.6 |
| 4,020,716 | A | | 5/1977 | Toth et al. |
| 4,037,694 | A | | 7/1977 | Keese |
| 4,091,688 | A | | 5/1978 | Huffman |
| 4,099,634 | A | | 7/1978 | McIntire et al. |
| 4,116,293 | A | | 9/1978 | Fukui |
| 4,126,201 | A | | 11/1978 | Stevens |
| 4,142,615 | A | | 3/1979 | Sidles, Jr. et al. |
| 4,158,971 | A | | 6/1979 | Szalai et al. |
| 4,159,657 | A | | 7/1979 | Stilley |
| 4,170,152 | A | | 10/1979 | Windish et al. |
| 4,186,626 | A | | 2/1980 | Chamberlain |
| 4,239,196 | A | | 12/1980 | Hanger |
| 4,300,651 | A | | 11/1981 | Krude |
| 4,317,498 | A | | 3/1982 | Jirousek et al. |
| 4,330,045 | A | * | 5/1982 | Myers ....................... 180/65.51 |
| 4,437,530 | A | | 3/1984 | De Young et al. |
| 4,532,689 | A | | 8/1985 | Harder et al. |
| 4,549,722 | A | | 10/1985 | Gagliano |
| 4,799,564 | A | * | 1/1989 | Iijima et al. ................ 180/65.51 |

(Continued)

*Primary Examiner* — Katy M Ebner
(74) *Attorney, Agent, or Firm* — Liell & McNeil

(57) ABSTRACT

An axle assembly includes an electric drive motor oriented along an axis and disposed within a central axle housing. The electric drive motor includes a motor housing having an engagement face perpendicular to the axis. A spindle assembly includes an external connection to the central axle housing and an internal engagement face that is perpendicular to the axis. A sealing member is in sealing contact with the engagement face of the motor housing and the internal engagement face of the spindle assembly.

15 Claims, 8 Drawing Sheets

20 22 34 36 42 68 48 44 46 48 70 62 56 58 60 52 64 A 32 54 50 28 24 30 26 38 40 66

(56) References Cited

U.S. PATENT DOCUMENTS 4,920,628 A 5/1990 Gennodie et al.
4,961,485 A 10/1990 Huff et al.
5,127,638 A 7/1992 Kent
5,356,351 A 10/1994 Hvolka
5,863,034 A 1/1999 Vauter
5,897,100 A 4/1999 Napier et al.
6,148,940 A 11/2000 Hokanson et al.
6,247,233 B1 * 6/2001 Hinton et al. ................ 29/894.3
6,286,620 B1 9/2001 Legman et al.
6,458,057 B2 10/2002 Massaccesi et al.
6,491,293 B1 12/2002 Brewer
6,588,538 B2 * 7/2003 Hinton et al. ................. 180/372
6,588,539 B2 7/2003 Hinton et al.
6,619,640 B1 9/2003 Ploski
6,651,762 B1 * 11/2003 Hokanson et al. ......... 180/65.51
6,811,514 B2 11/2004 Bowman
6,921,240 B2 7/2005 Moore
7,044,883 B2 5/2006 Andersson et al.
7,147,073 B2 12/2006 Mollhagen
7,178,425 B2 2/2007 Marich
7,204,782 B2 4/2007 Ciszak
7,232,000 B2 6/2007 Brossard
7,314,105 B2 1/2008 Varela
2002/0134597 A1 * 9/2002 Mann et al. .................. 180/65.5
2005/0074316 A1 4/2005 Hedley et al.
2006/0063630 A1 3/2006 Jurado

* cited by examiner

AXLE ASSEMBLY FOR ELECTRIC DRIVE MACHINE

TECHNICAL FIELD

The present disclosure relates generally to an axle assembly for an electric drive machine, and more particularly to an axle assembly including a sealing engagement between a motor housing and a spindle assembly.

BACKGROUND

Large off-highway machines, such as mining trucks, are known to employ electric drive propulsion systems to propel or retard the machine. Typically, an electric drive propulsion system includes an alternator, or other electrical power generator, driven by an internal combustion engine. The alternator, in turn, supplies electrical power to one or more electric drive motors connected to wheels of the machine. Oftentimes, the electric drive motor, along with other components, such as, for example, a final drive assembly and a wheel assembly, are mounted on an axle of the machine as a unitized structure. However, given the extreme size and weight of these large components, servicing may prove difficult. For example, removal of one component, such as, for example, the final drive assembly, may require removal of the entire unitized structure.

A preferred arrangement for the electric drive propulsion systems may include the electric drive motors mounted independently from the final drive assembly, and other wheel components. For example, U.S. Pat. No. 6,148,940 teaches a motorized wheel arrangement having an electric drive motor and a transmission mounted on opposite ends of a wheel frame. This arrangement may be preferred, at least for serviceability reasons; however, proper sealing between the components may provide a challenge. Therefore, it should be appreciated that a continuing need exists for electric drive propulsion systems, especially for large off-highway machines, having efficient designs and improved serviceability.

The present disclosure is directed to one or more of the problems set forth above.

SUMMARY OF THE DISCLOSURE

In one aspect, an axle assembly includes an electric drive motor oriented along an axis and disposed within a central axle housing. The electric drive motor includes a motor housing having an engagement face perpendicular to the axis. A spindle assembly includes an external connection to the central axle housing and an internal engagement face that is perpendicular to the axis. A sealing member is in sealing contact with the engagement face of the motor housing and the internal engagement face of the spindle assembly.

In another aspect, an electric drive machine includes an axle assembly having a central axle housing, a spindle assembly, a wheel assembly, and a final drive assembly. At least one electric drive motor, having a motor housing, is oriented along an axis and disposed within the central axle housing. The spindle assembly includes an external connection to the central axle housing and an internal sealing engagement with the motor housing defining an internal axle cavity. A lubrication system, including a pump, is configured to deliver a supply of lubricant to the internal axle cavity using at least one lubrication line.

In yet another aspect, an electric drive off-highway truck includes a rear axle assembly having a central axle housing. A pair of opposed electric drive motors, each having a motor housing, are oriented along an axis and disposed within the central axle housing. A pair of opposed spindle assemblies are oriented along the axis. Each spindle assembly includes an external connection to the central axle housing and an internal sealing engagement with the motor housing of a respective one of the electric drive motors.

In yet another aspect, a method for assembling an axle assembly of an electric drive machine includes mounting an electric drive motor along an axis within a central axle housing. The electric drive motor includes a motor housing having an engagement face that is perpendicular to the axis. An outer portion of a spindle assembly, having an internal engagement face perpendicular to the axis, is attached to the central axle housing. During this attachment, opposite sides of a sealing member are contacted with the internal engagement face of the spindle assembly and the engagement face of the motor housing.

DETAILED DESCRIPTION

Figure 1:
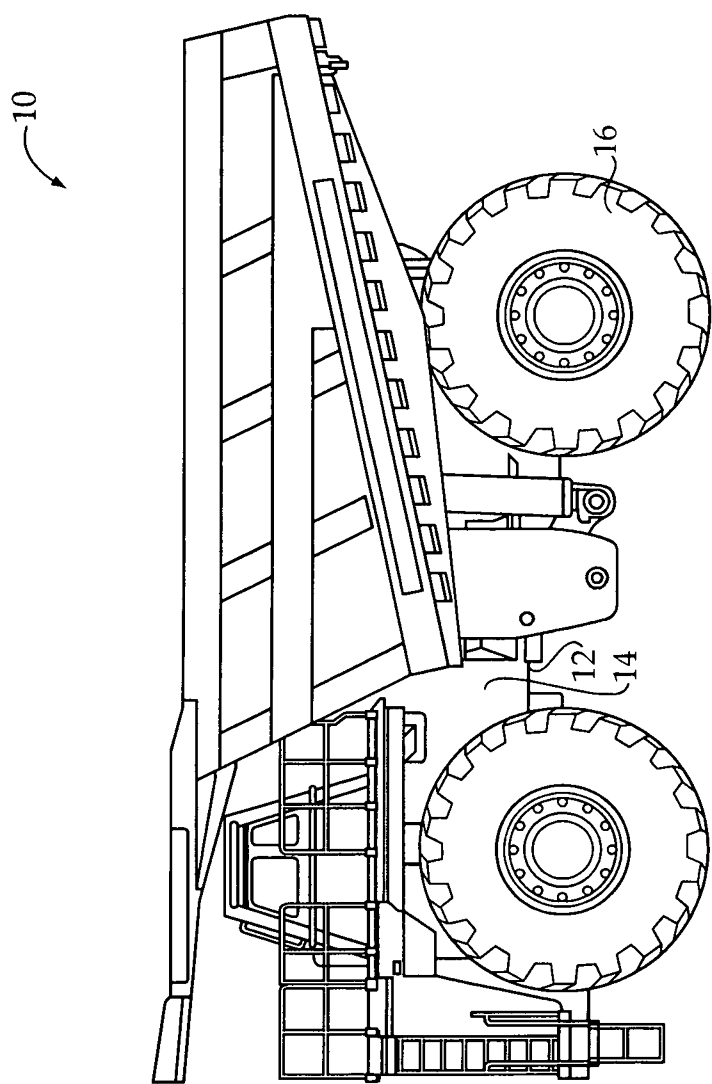
FIG. 1 is a side diagrammatic view of an electric drive machine, according to the present disclosure.

An exemplary embodiment of a machine 10 is shown generally in FIG. 1. The machine 10 may be a mining truck, as shown, or any other off-highway or on-highway vehicle having an electric drive propulsion system. As such, machine 10 may also be referenced herein as an electric drive machine or, more specifically, an electric drive off-highway truck. In the illustrated embodiment, machine 10 generally includes a frame 12 having an electric drive propulsion system 14 supported thereon for driving wheels of the machine 10, such as, for example, rear wheels 16 (only one of which is shown). Electric drive propulsion systems, such as electric drive propulsion system 14, are generally known and, therefore, the entire system will not be described herein in detail.

One skilled in the art, however, should appreciate that an exemplary electric drive propulsion system, such as electric drive propulsion system 14, may include an internal combustion engine, such as, for example, a compression or spark-ignited engine, that provides power to an alternator, or other electrical power generator. The alternator may produce electrical power sufficient to power one or more electric drive motors that, in turn, power rear wheels 16 to propel the machine 10.

Figure 2:
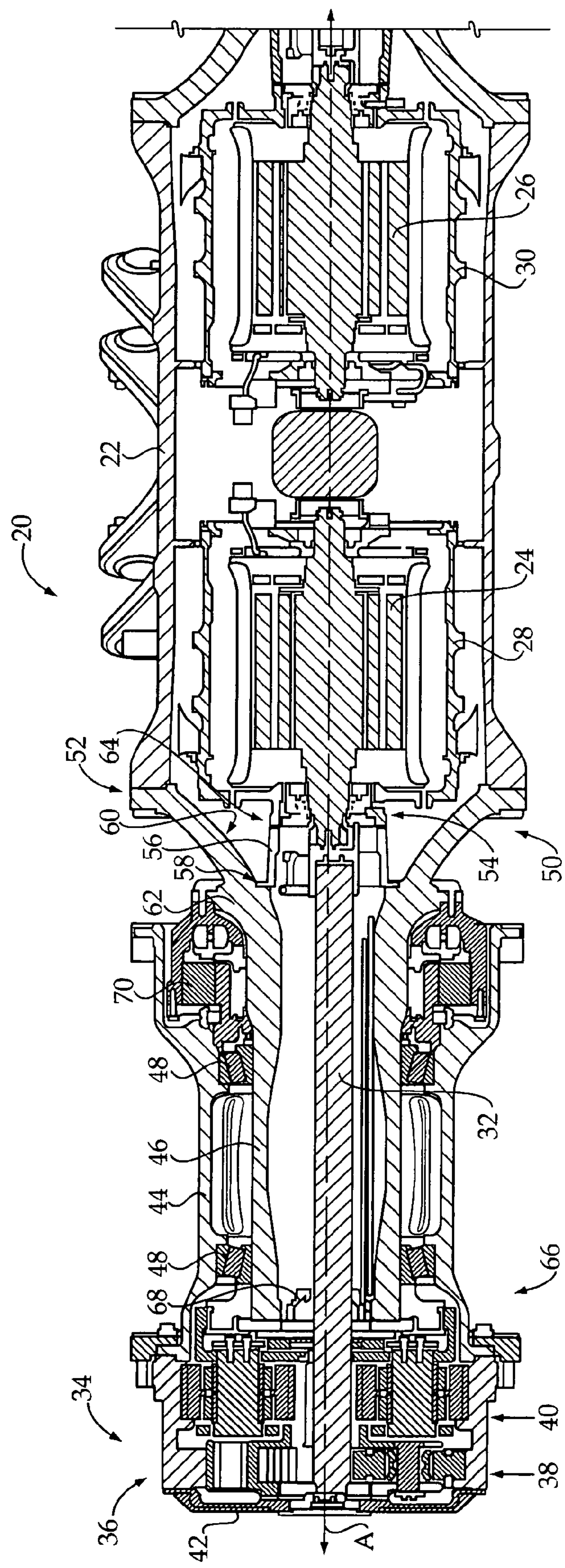
FIG. 2 is a side diagrammatic view, in cross section, of a rear axle assembly of the electric drive machine of FIG. 1.

Turning now to FIG. 2, an axle assembly 20, such as a rear axle assembly, may be attached to the frame 12 of machine 10 using any of well known attachment means, and may support wheels, such as the rear wheels 16 shown in FIG. 1. The axle assembly 20 may include a central axle housing 22 that may include the attachment means (e.g., fasteners) to the machine frame 12. A pair of opposed electric drive motors 24 and 26 of the electric drive propulsion system 14 may be oriented along an axis, such as a substantially horizontal axis A, and may be disposed within the central axle housing 22. The electric drive motors 24 and 26 may be disposed within motor housings 28 and 30, respectively, and may be powered using an alternating electrical current or, alternatively, a direct electrical current. It should be appreciated that one or more rectifiers or inverters may be used to convert and/or condition the electrical current, as necessary. According to one example, it may be desirable to modulate the frequency of the electrical current to control the speed of the electric drive motors 24 and 26.

Electric drive motor 24 may be operatively connected to an axle shaft 32. Specifically, the electric drive motor 24 may be configured to drive the axle shaft 32, which, in turn, may be configured to drive a final drive assembly 34, or final drive planetary gear set. The final drive assembly 34 may, for example, include a double reduction planetary gear set 36, discussed below in greater detail, which includes a first reduction planetary gear set 38 and a second reduction planetary gear set 40. As shown in the illustrated embodiment, the first reduction planetary gear set 38 may be positioned outward of the second reduction planetary gear set 40 and may be directly driven by the axle shaft 32. The first reduction planetary gear set 38 may, in turn, drive the second reduction planetary gear set 40. A service cover 42, described later in greater detail, may be removably attached to the final drive assembly 34 for accessing and/or inspecting one or more components of the axle assembly 20.

The final drive assembly 34 or, more specifically, the second reduction planetary gear set 40, may be configured to rotate a wheel assembly 44. The wheel assembly 44 may be positioned between the central axle housing 22 or, more specifically, the motor housing 28 and the final drive assembly 34, and may be configured to support wheels, such as the rear wheels 16 of FIG. 1. It should be appreciated that wheel assembly 44 may be configured to support one wheel or, alternatively, a pair of wheels, as is known in the art. The wheel assembly 44 may be rotatably supported on a spindle assembly 46 extending from the central axle housing 22. According to one embodiment, the wheel assembly 44 may be rotatably mounted on the spindle assembly 46 using known wheel or roller bearings 48.

The spindle assembly 46, at a first end 50 thereof, may have an external connection 52, such as, for example, a bolted connection, to the central axle housing 22. In addition, the spindle assembly 46 may have an internal sealing engagement, referenced generally at 54, with the motor housing 28. More specifically, the first end 50 of the spindle assembly 46 may include an intermediate housing 56 having a first end 58 connected to an internal surface 60 of a spindle 62 and a second end 64 defining, at least a portion of, the internal sealing engagement 54. Alternatively, however, the spindle assembly may include an integral structure having an intermediate portion extending from the internal surface 60 of the spindle 62 and terminating in the internal sealing engagement 54. A second end 66 of the spindle assembly 46 or, more specifically, spindle 62 is rotatably engaged by the wheel assembly 44 and supports, at least a portion of, the final drive assembly 34.

A support housing 68 may also be provided within a hollow portion of the spindle assembly 46, such as at the second end 66 thereof. Specifically, the support housing 68 may be configured to receive the axle shaft 32 therethrough, with a limited amount of clearance, to allow rotation, but prevent undesirable whipping or deflection of the axle shaft 32. As such, the support housing 68 may include any known support bearing positioned along the axle shaft 32 between the motor housing 28 and the final drive assembly 34. According to the illustrated embodiment, the support housing 68 may include a substantially frustoconical shape having a first end supported by the internal surface 60 of the spindle 62 and a second end configured to receive the axle shaft 32. It should be appreciated, however, that any know means for limiting substantial deflection of the axle shaft 32 are contemplated.

A brake assembly 70, including any known brake system, may also be provided for slowing or stopping rotation of the wheel assembly 44 relative to the spindle assembly 46. Brake systems, however, and other additional features that may be incorporated into the axle assembly 20 are only peripherally within the scope of the present disclosure and, therefore, will not be described in detail. It should be appreciated that electric drive motor 26, which is also disposed within central axle housing 22, may drivingly engage components similar to those described with respect to electric drive motor 24 and, therefore, will not be discussed. In fact, it should be appreciated that a spindle assembly, a final drive assembly, and a wheel assembly, receiving power from the electric drive motor 26, may represent a mirror image of the corresponding components described with respect to electric drive motor 24.

Figure 3:
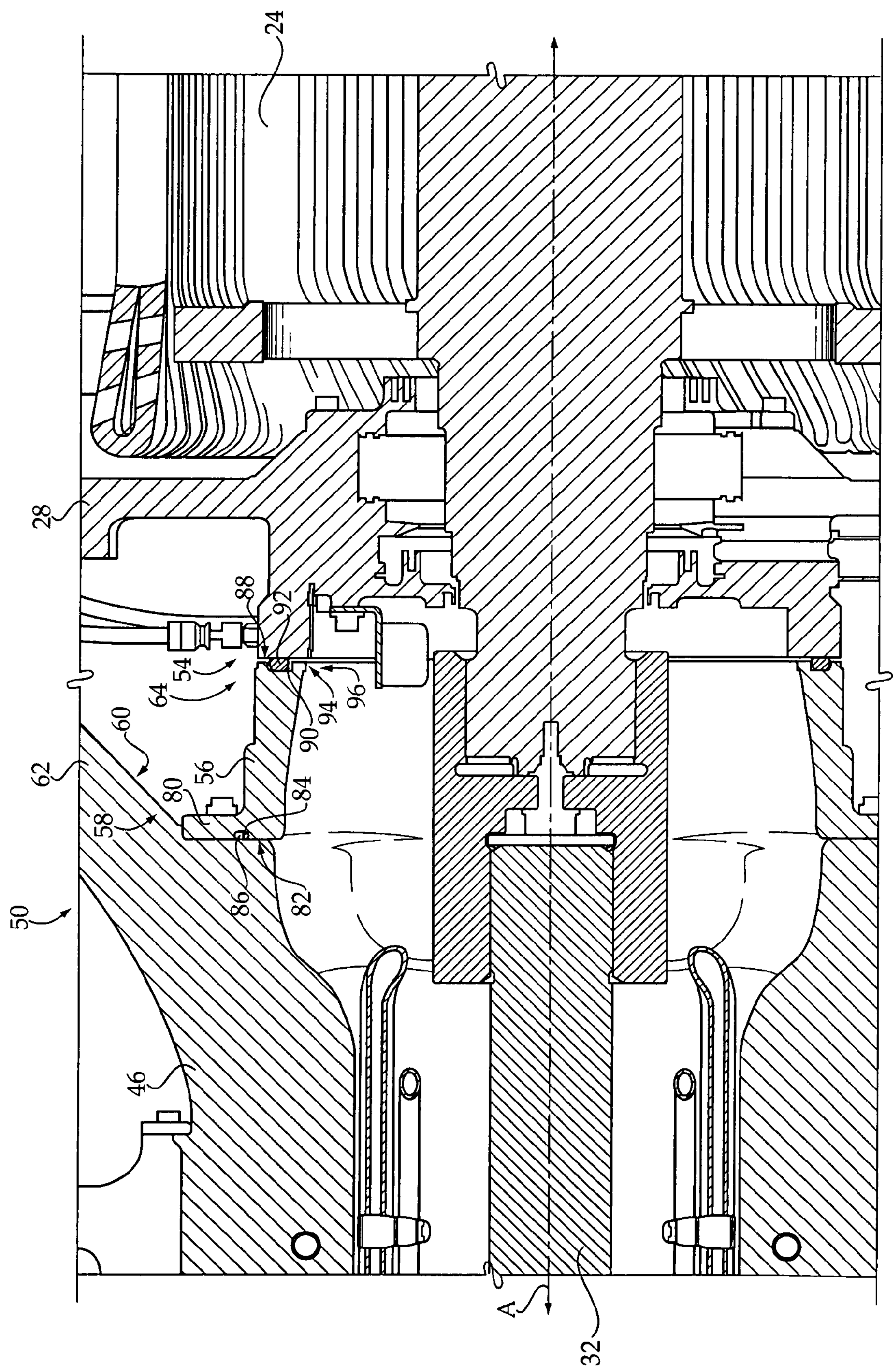
FIG. 3 is a side diagrammatic view, in cross section, of an engagement between a spindle assembly and a motor housing of the rear axle assembly of FIG. 2.

Turning now to FIG. 3, the intermediate housing 56 will be described in greater detail. Specifically, the first end 58 of the intermediate housing 56 may include a radially extending mounting flange 80 attached to the internal surface 60 of the spindle 62, such as, for example, through a bolted connection. The mounting flange 80 may include, although not necessarily, a mounting face 82 that is substantially perpendicular to the axis A. Further, the mounting face 82 may include a first seal groove 84 therein, having a substantially annular shape, for receiving a sealing member, such as a first axial seal 86, also referred to as a face seal. As shown, the intermediate housing 56 may include a substantially frustoconical shape extending from the mounting flange 80 and terminating in the internal sealing engagement 54, referenced above.

More specifically, the second end 64 of the intermediate housing 56 may define an internal engagement face 88 of the spindle assembly 46. The internal engagement face 88 may be substantially perpendicular to the horizontal axis A and may include a second seal groove 90 therein for receiving, or contacting, a sealing member 92, such as a second axial seal, or face seal. The internal engagement face 88 may be substantially aligned with, but not contacting, an engagement face 94 of the motor housing 28, in an assembled configuration of the components, as shown. The engagement face 94 of the motor housing 28 may also be substantially perpendicular to the horizontal axis A, and may be configured to contact the sealing member 92, when assembled. Specifically, the sealing member 92 may be in sealing contact, such as to form a seal, with the engagement face 94 of the motor housing 28 and the internal engagement face 88 of the spindle assembly 46.

A tolerance dependent gap 96 may be provided between the engagement face 94 of the motor housing 28 and the internal engagement face 88 of the spindle assembly 46. The tolerance dependent gap 96 may be provided for a variety of reasons, such as, for example, accommodating manufacturing tolerances. As such, a manufacturing tolerance may dictate a size of the tolerance dependent gap 96 to accommodate a predetermined tolerance range. It should be appreciated that the sealing member 92 may be selected to avoid contact between housings but provide adequate sealing between the spindle assembly 46 and the motor housing 28. According to one example, it may be desirable to utilize an O-ring having a large range of compression.

During assembly, the electric drive motor 24 may be mounted within the central axle housing 22, shown in FIG. 2. The spindle assembly 46, already assembled, may then be attached, at an outer portion thereof, to the central axle housing 22, such as using a bolted connection. Simultaneously, opposite sides of the sealing member 92 may be contacted with both the internal engagement face 88 of the spindle assembly 46 or, more specifically, the intermediate housing 56 and the engagement face 94 of the motor housing 28. According to one embodiment, it may be desirable to first secure the sealing member 92 with the axial seal groove 90, such as using an adhesive or other attachment means, prior to attaching the spindle assembly 46 to the central axle housing 22.

It should be appreciated that the tolerance dependent gap 96 provided between the engagement face 94 of the motor housing 28 and the internal engagement face 88 of the spindle assembly 46 may be useful during assembly, since the engagement between the two components is a "blind" engagement. Specifically, the engagement between the components may not be readily observed during assembly. As such, it may be important that the sealing member 92 be sized to provide adequate sealing between the spindle assembly 46 and the motor housing 28, since the components may be maintained out of direct contact and the tolerance dependent gap 96 for different assemblies may vary.

Figure 4:
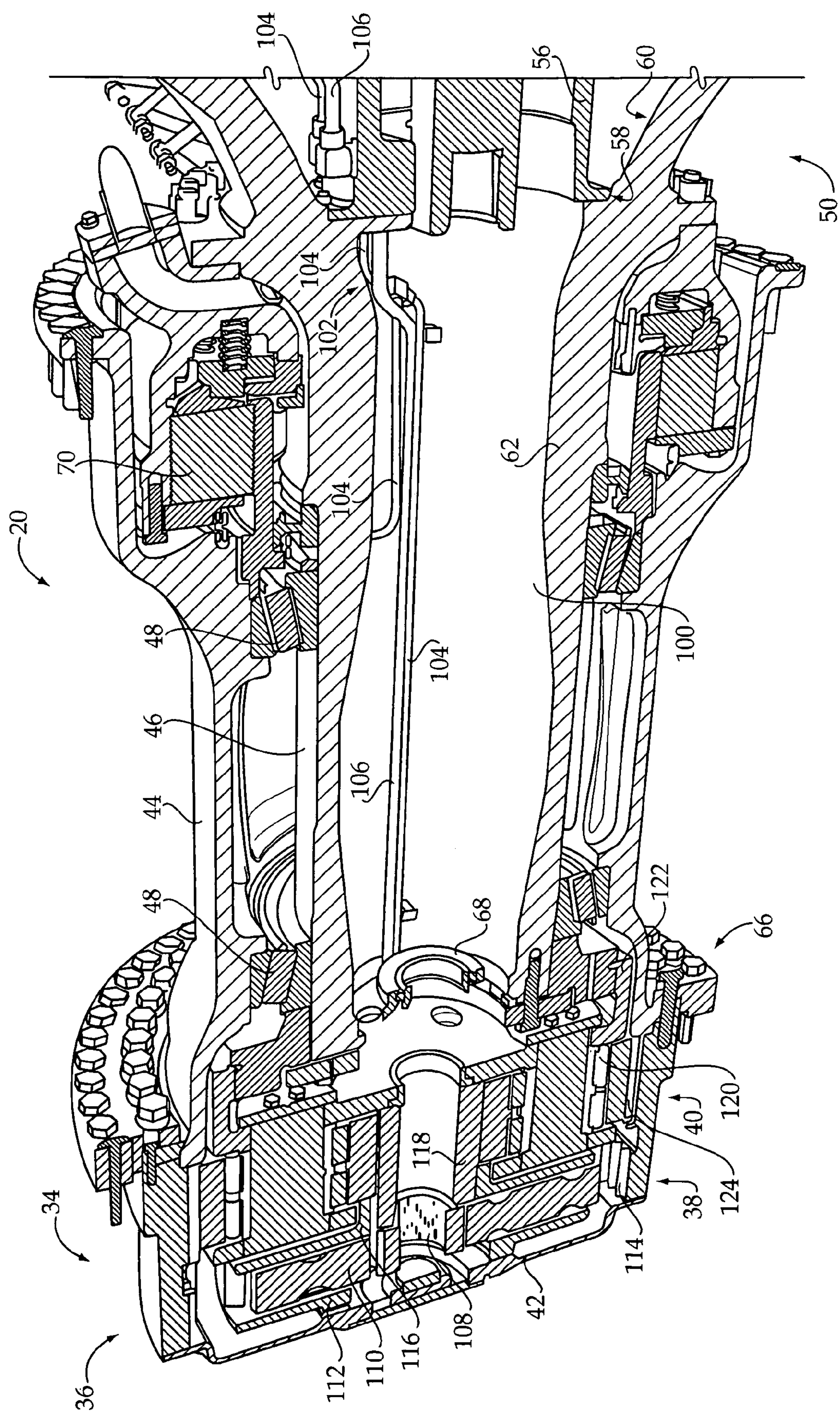
FIG. 4 is a perspective diagrammatic view, in cross section, of the rear axle assembly of FIG. 2, including a lubrication system therefor.

It should be appreciated that the intermediate housing 56 or, more specifically, the internal sealing engagement 54 may seal an internal axle cavity 100, or lubrication chamber, defined by the spindle assembly 46 and the final drive assembly 34, as shown in FIG. 4. The internal axle cavity 100 may contain a supply of lubricant, such as a sump or reservoir, for lubricating components of the axle assembly 20, such as gears and bearings, and dissipating heat therefrom. A lubrication system 102 may transfer lubricant to and from the internal axle cavity 100, and may generally include at least one of a supply line 104 and a suction line 106. Preferably, the lubrication system 102 includes at least one supply line 104 for providing lubricant directly to one or more components of the axle assembly 20, and at least one suction line 106 for drawing lubricant from the internal axle cavity 100. It should be appreciated that the lubrication system 102 may also include a pump (not shown) connecting one of the supply line 104 and the suction line 106 with the internal axle cavity 100, and any other necessary components, such as, for example, filters and conduits. According to one embodiment, the pump may be positioned outside of the axle assembly 20 and, further, may be supported by the axle assembly 20.

The supply line 104 may include one or more diverging lines, or channels, that provide a flow of lubricant directly to one or more components of the axle assembly 20. For example, the supply line 104 may include a diverging channel for directing lubricant toward the wheel bearings 48, and a diverging channel for directing lubricant toward one or more components of the final drive assembly 34. It should be appreciated that one or both of the supply and suction lines 104 and 106, and any additional fluid lines, may extend through one or both of the intermediate housing 56 and the support housing 68.

According to a specific example, the supply line 104 may include a diverging channel having a directed nozzle for supplying a stream of lubricant to one or more relatively stationary components of the final drive assembly 34. For example, the first reduction planetary gear set 38 may include a sun gear 108 that may be driven by the axle shaft 32 (shown removed). As the sun gear 108 rotates, it may drivingly engage a set of planetary gears 110, supported by a carrier housing 112, and in mesh with a ring gear 114. The ring gear 114 may be attached to the wheel assembly 44, as shown.

As the planetary gears 110 and the carrier housing 112 rotate, a splined engagement feature 116 extending from the carrier housing 112 may drivingly engage a sun gear 118 of the second reduction planetary gear set 40. The sun gear 118 of the second reduction planetary gear set 40, in turn, may drive a set of planetary gears 120, supported by a carrier housing 122. As shown, the carrier housing 122 may be attached to the spindle assembly 46 and, as such, may remain relatively stationary. It should be appreciated, therefore, that driving engagement of the planetary gears 120, supported within the relatively stationary housing 122, may drive a ring gear 124 of the second reduction planetary gear set 40 and, as a result, rotate the wheel assembly 44 attached thereto. It should also be appreciated that, because of the stationary nature of the carrier housing 122 of the second reduction planetary gear set 40, one or more of the planetary gears 120 may not receive adequate lubrication from the reservoir within the internal axle cavity 100. Therefore, it may be desirable to direct a supply of lubricant from the supply line 104 to the planetary gears 120.

Figure 5:
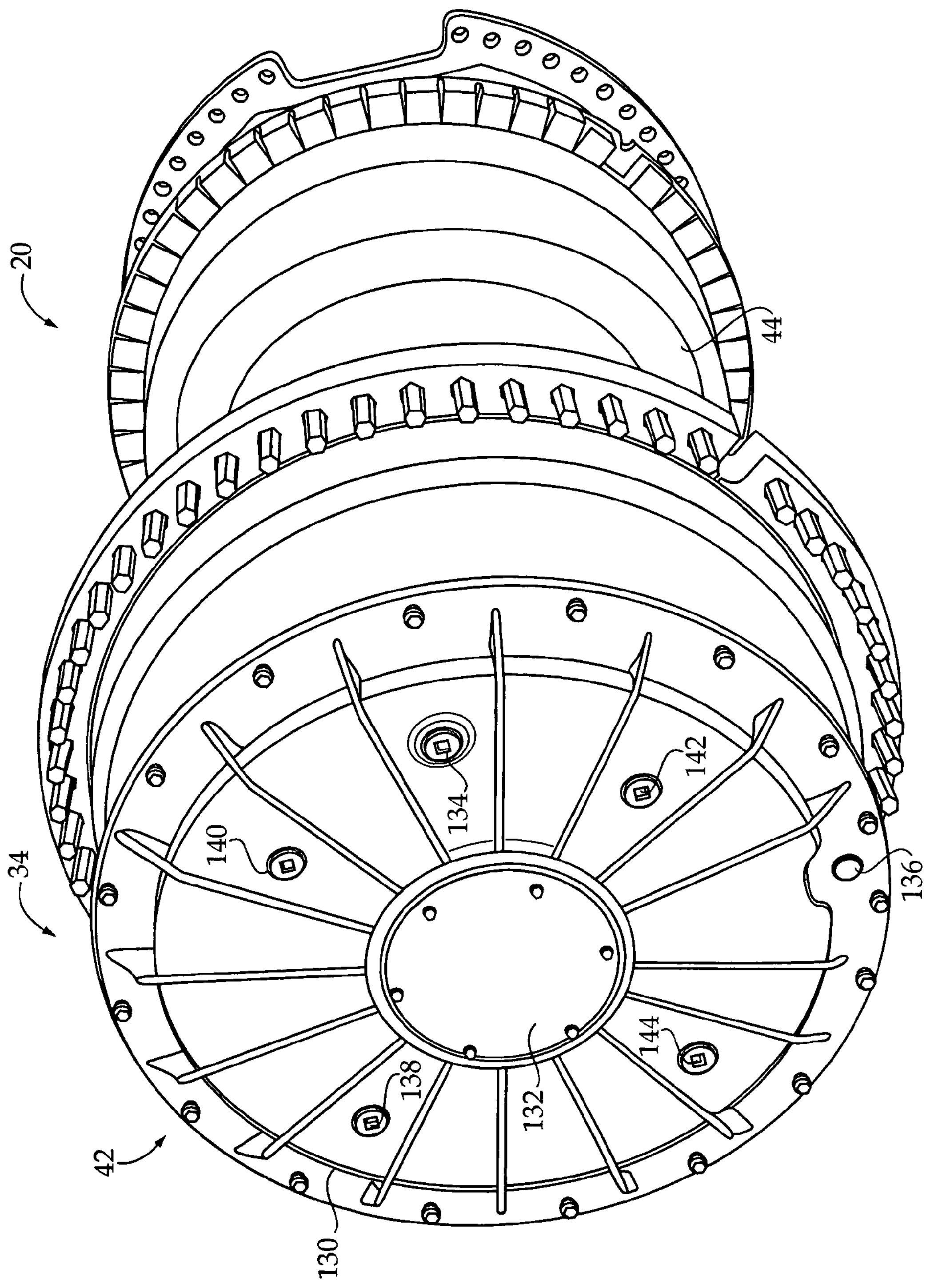
FIG. 5 is a perspective diagrammatic view, in cross section, of a final drive assembly, and removable carrier housing therefor, of the rear axle assembly of FIG. 2.

Turning now to FIG. 5, the service cover 42 is shown in greater detail. Specifically, the service cover 42 may include an outer cover 130, attached to the final drive assembly 34, and an inner cover 132, attached to a portion of the outer cover 130. According to one embodiment, the outer cover 130 and the inner cover 132 may be concentric with the axle shaft 32, shown in both FIGS. 2 and 3. The service cover 42 may also include a fill cover 134, or plug, positioned to seal an opening provided through the service cover 42 or, more specifically, the outer cover 130. Such an opening may be useful to supply lubricant to the internal axle cavity 100, shown in FIG. 4.

In addition, a drain cover 136, or plug, may be provided for sealing an additional opening through the service cover 42. The additional opening may be useful for removing or draining lubricant from the internal axle cavity 100. For example, the wheel assembly 44, and final drive assembly 34 attached thereto, may be rotated to position the drain cover 136 at a bottom portion of the internal axle cavity 100 to allow drainage of lubricant through the additional opening when the drain cover 136 is removed. According to one embodiment, one or both of the drain cover 136 and the fill cover 134 may include a magnetic plug, as is known in the art, for collecting wear debris that may be circulating within the lubricant.

The service cover 42 may also include one or more site gauges, such as, for example, site gauges 138, 140, 142, and 144. The site gauges 138, 140, 142, and 144 may be used for detecting a lubricant level within the internal axle cavity 100, and may be positioned, as desired, on one or both of the inner cover 132 and outer cover 130. It should be appreciated that both the inner and outer covers 132 and 130 of the service cover 42 may be designed to provide a desired stiffness and, according to some applications, a desired amount of heat transfer. In addition, both the inner and outer covers 132 and 130 may be removably attached using a bolted connection, or any other known attachment means, and may further include any necessary means to adequately seal the internal axle cavity 100, when attached.

One or both of the inner cover 132 and the outer cover 130 may be removed for inspecting and/or accessing components of the axle assembly 20. According to one example, it may be desirable to remove the inner cover 132 to inspect wear of components of the final drive assembly 34. According to another example, it may be desirable to disconnect the electric drive motor 24 from the final drive assembly 34 and, therefore, the wheel assembly 44. For example, when towing the machine 10, it may be desirable to remove the inner cover 132 and, without having to drain a substantial amount of lubricant within the internal axle cavity 100, pull the axle shaft 32. As such, it may be desirable to position the inner cover 132 above a lubricant level within the internal axle cavity 100. Removing the axle shaft 32 may remove the driving engagement between the electric drive motor 24 and wheel assembly 44, shown in FIG. 2. As such, rotation of the wheels 16 (FIG. 1) and, therefore, the wheel assembly 44 may occur without rotation of the final drive assembly 34, thus reducing the possibility of component damage.

Figure 6:
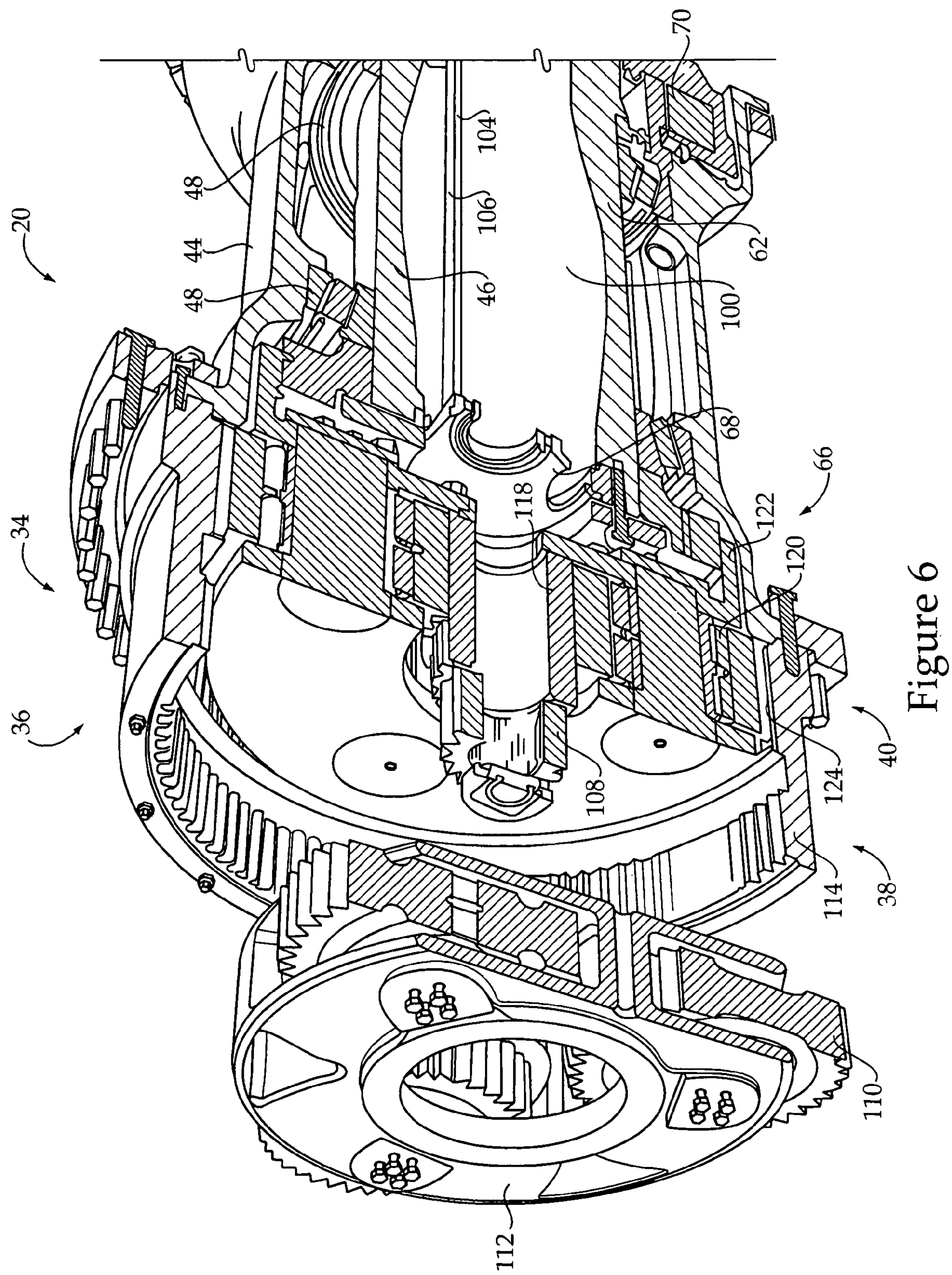
FIG. 6 is a perspective diagrammatic view of a service cover of the rear axle assembly of FIG. 2.

According to an additional example, it may be desirable to change the gear ratio of the final drive assembly 34. This may be accomplished, without requiring the removal of the final drive assembly 34 or wheel assembly 44 from machine 10, by draining the lubricant from the internal axle cavity 100, such as by using the drain cover 136, and then removing the service cover 42. As shown in FIG. 6, the gear ratio produced by the double reduction planetary gear set 36 may be changed by removing and replacing both the sun gear 108 and the set of planetary gears 110 of the first reduction planetary gear set 38. Specifically, the planetary gears 110 may be removed by disengaging the carrier housing 112 from an attachment to the final drive assembly 34. The sun gear 108 may also be removed, by disengaging the sun gear 108 from a splined end of the axle shaft 32 of FIGS. 2 and 3. A replacement sun gear and a replacement carrier housing, having a replacement set of planetary gears, may then be positioned within the final drive assembly 34. It should be appreciated that the replacement planetary gears and the replacement sun gear may have a similar gear pitch geometry to those components they are replacing, but may differ in tooth count and, therefore, gear ratio.

Figure 7:
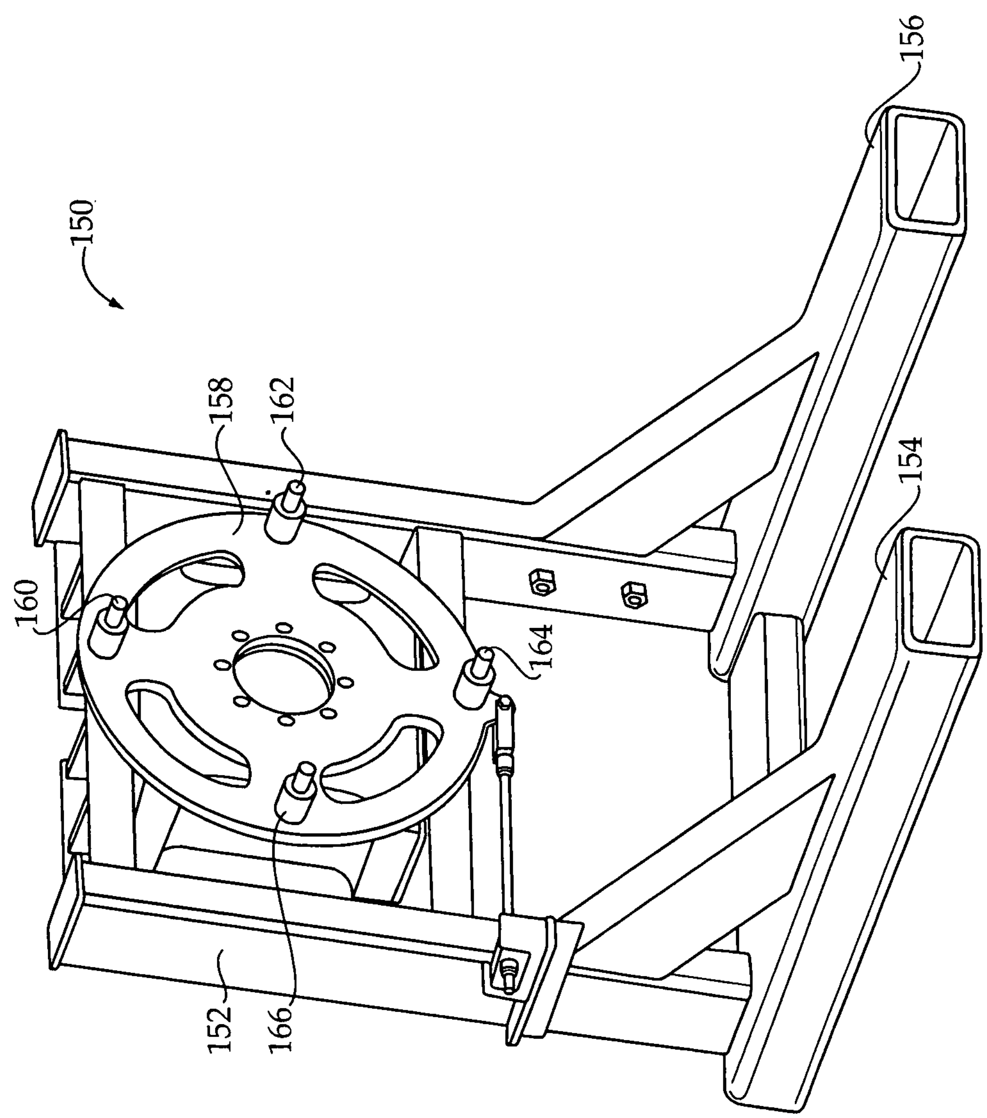
FIG. 7 is a perspective diagrammatic view of a motor removal tool for use with a rear axle assembly, according to the present disclosure.

Turning now to FIG. 7, a motor removal tool 150 useful for withdrawing the electric drive motor 24 (FIGS. 2 and 3) from the central axle housing 22, or mounting the electric drive motor 24 therein, is shown. Specifically, the motor removal tool 150 may include a frame 152 that may extend from, and may be substantially perpendicular to, hollow arms 154 and 156 configured to receive forks, or tines, of a forklift (not shown). The frame 152 may also support a rotatable mounting assembly 158 having engagement features, such as bolts 160, 162, 164, and 166, extending therefrom. The bolts 160, 162, 164, and 166 may be positioned and configured to engage threaded bores provided within the electric drive motor 24.

Figure 8:
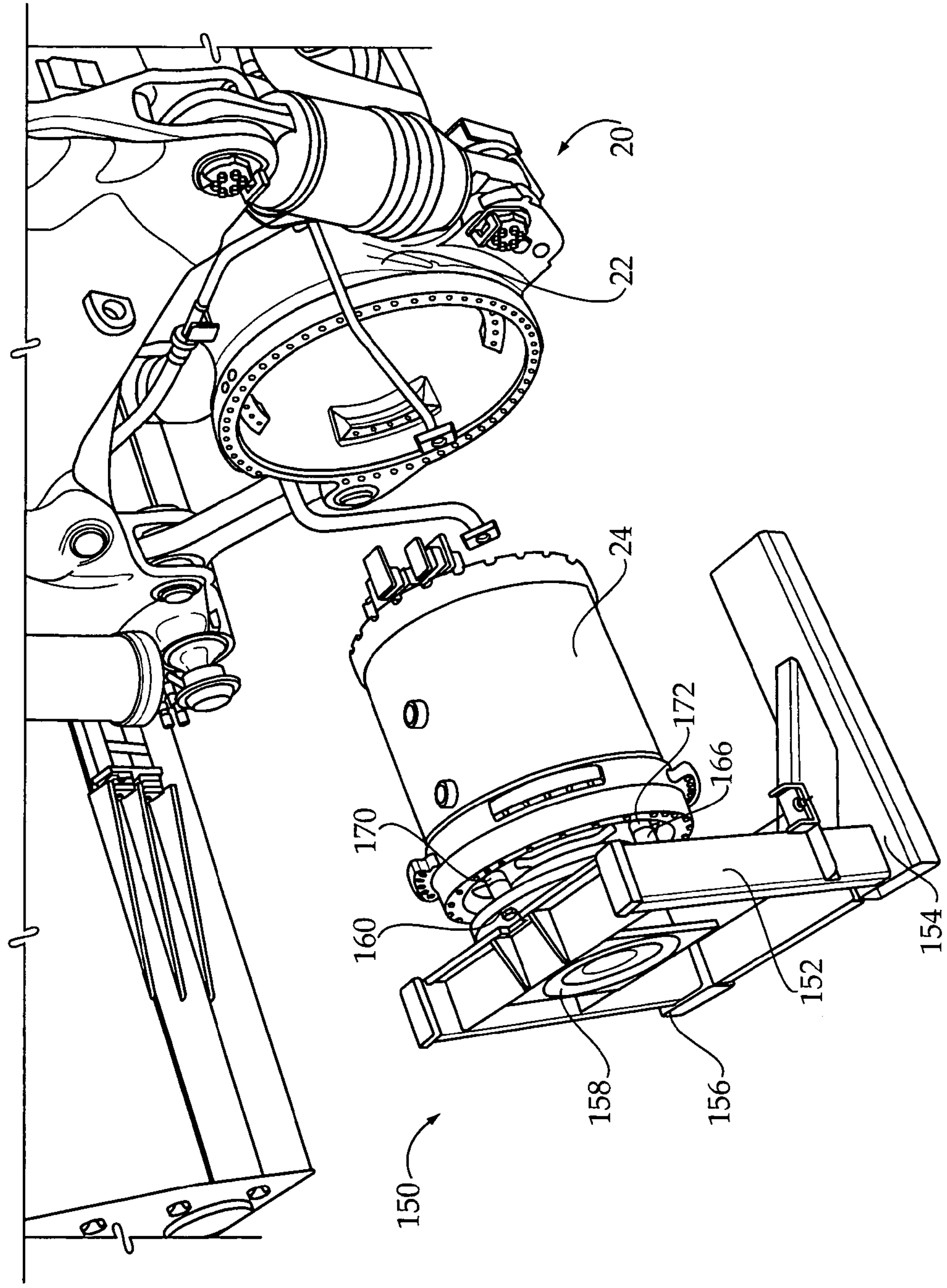
FIG. 8 is a perspective diagrammatic view of the motor removal tool of FIG. 7, supporting an electric drive motor thereon.

Turning now to FIG. 8, the motor removal tool 150 is shown supporting the electric drive motor 24. Specifically, during an assembly or disassembly of the axle assembly 20, the final drive assembly 34, wheel assembly 44, and spindle assembly 46 may be removed from the central axle housing 22, as shown. During a disassembly process, for example, a forklift (not shown) may engage hollow arms 154 and 156 to position the motor removal tool 150 such that the engagement features align with threaded bores, such as, for example, threaded bores 170 and 172, of the electric drive motor 24. The rotatable mounting assembly 158 may be rotated, as necessary, to properly align the bolts 160, 162, 164, and 166, shown in FIG. 7, of the motor removal tool 150 with threaded bores, such as bores 170 and 172, of the electric drive motor 24. After proper engagement of the engagement features, the electric drive motor 24 may be extracted from or, alternatively, positioned within the central axle housing 22. Such a motor removal tool 150 may reduce the need for overhead lifts and hoists commonly used to support the relatively large electric drive motor 24 during servicing and/or assembly.

INDUSTRIAL APPLICABILITY

The present disclosure finds potential application in any machine that utilizes an electric drive propulsion system. Further, the disclosure may be specifically applicable to an electric drive machine having an electric drive motor mounted independently from a final drive assembly and a wheel assembly of the machine. Yet further, the present disclosure may be applicable to electric drive propulsion systems requiring improved serviceability. Such machines may include, but are not limited to, off-highway machines, such as mining trucks, on-highway machines, such as buses and trucks, and other machines known in the art.

Referring generally to FIGS. 1-8, a machine 10 may include a frame 12 having an electric drive propulsion system 14 supported thereon for driving wheels 16 of the machine 10. The electric drive propulsion system 14 may include an internal combustion engine, such as, for example, a compression or spark-ignited engine, that provides power to an alternator, or other electrical power generator. The alternator may produce electrical power sufficient to power one or more electric drive motors, such as electric drive motors 24 and 26, that, in turn, power rear wheels 16 to propel the machine 10. The axle assembly 20, as disclosed herein, may provide a preferred arrangement for the electric drive motors 24 and 26, the final drive assembly 34, and the wheel assembly 44, having an efficient design, including proper sealing between components, and improved serviceability.

Specifically, for example, the electric drive motor 24 may be mounted within a central axle housing 22, independently from the final drive assembly 34 and the wheel assembly 44, and configured to drive an axle shaft 32. A spindle assembly 46, at a first end 50 thereof, may be attached to the central axle housing 22 and configured to support a final drive assembly 34, at a second end 66 thereof. The final drive assembly 34 may be driven by the axle shaft 32 and configured to rotate a wheel assembly 44 supported by the spindle assembly 46 and positioned inward of the final drive assembly 34. An internal axle cavity 100, defined by the spindle assembly 46 and the final drive assembly 34, may be properly sealed using an intermediate housing 56 attached to an internal surface 60 of a spindle 62.

The intermediate housing 56, at a second end 64 thereof, may define an internal engagement face 88 of the spindle assembly 46. The internal engagement face 88 may be substantially perpendicular to a horizontal axis A and may include a seal groove 90 therein for receiving, or contacting, a sealing member 92. The internal engagement face 88 may be substantially aligned with an engagement face 94 of the motor housing 28 that is also substantially perpendicular to the horizontal axis A and configured to contact sealing member 92. Specifically, the sealing member 92 may be in sealing contact, such as to form a seal, with the engagement face 94 of the motor housing 28 and the internal engagement face 88 of the spindle assembly 46, as described above. It should be appreciated that the external connection between the spindle assembly 46 and the central axle housing 22 may be circumferentially spaced from the internal engagement face 88 of the spindle assembly 46.

It should be appreciated that the axle assembly 20, including the features described herein, may provide an efficient design for large machines, such as machine 10, utilizing electric drive propulsion systems. Further, the axle assembly 20 of the present disclosure, by design, may provide improved serviceability, especially given the extreme size and weight of the components of the electric drive propulsion system 14, which are supported by the axle assembly 20.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. An axle assembly, comprising:

an electric drive motor oriented along an axis and disposed within a central axle housing, wherein the electric drive motor includes a motor housing having an engagement face perpendicular to the axis;

a spindle assembly, at a first end thereof, having an internal engagement face, wherein the internal engagement face is perpendicular to the axis; and a sealing member attached to one of the engagement face of the motor housing and the internal engagement face of the spindle assembly;

wherein the sealing member is in sealing contact with both the engagement face of the motor housing and the internal engagement face of the spindle assembly only when the spindle assembly has an external connection to the central axle housing;

wherein the spindle assembly is mounted to the central axle housing independently from the motor housing.

2. The axle assembly of claim 1, wherein the first end of the spindle assembly includes an intermediate portion extending from an internal surface of the spindle assembly and terminating in the internal engagement face, wherein the external connection is circumferentially spaced from the internal engagement face.

3. The axle assembly of claim 1, wherein the spindle assembly includes a spindle and an intermediate housing, wherein the intermediate housing includes a first end connected to an internal surface of the spindle and a second end defining the internal engagement face of the spindle assembly.

4. The axle assembly of claim 3, wherein the intermediate housing includes a frustoconical shape extending from the first end thereof and terminating in the internal engagement face of the spindle assembly.

5. The axle assembly of claim 3, further including a sealing member positioned between the first end of the intermediate housing and the internal surface of the spindle.

6. The axle assembly of claim 1, further including a tolerance dependent gap between the engagement face of the motor housing and the internal engagement face of the spindle assembly.

7. The axle assembly of claim 1, wherein the electric drive motor is operatively connected to an axle shaft, wherein a final drive assembly is disposed at a second end of the spindle assembly and driven by the axle shaft.

8. The axle assembly of claim 7, wherein the final drive assembly is configured to rotate a wheel assembly supported by the spindle assembly and positioned inward of the final drive assembly.

9. The axle assembly of claim 8, further including a support housing configured to receive the axle shaft therethrough and positioned between the motor housing and the final drive assembly.

10. An electric drive machine, comprising:

an axle assembly including a central axle housing, a spindle assembly, a wheel assembly, and a final drive assembly;

at least one electric drive motor oriented along an axis and disposed within the central axle housing, wherein the electric drive motor includes a motor housing having an engagement face;

wherein the spindle assembly includes an internal engagement face;

a sealing member attached to one of the engagement face of the motor housing and the internal engagement face of the spindle assembly;

wherein the sealing member is in sealing contact with both the engagement face of the motor housing and the internal engagement face of the spindle assembly to define an internal axle cavity within the spindle assembly only when the spindle assembly has an external connection to the central axle housing;

wherein the spindle assembly is mounted to the central axle housing independently from the motor housing; and a lubrication system including a pump configured to deliver a supply of lubricant to the internal axle cavity using at least one lubrication line.

11. The electric drive machine of claim 10, wherein the engagement face of the motor housing and the internal engagement face of the spindle assembly are perpendicular to the axis.

12. The electric drive machine of claim 11, wherein the spindle assembly includes a spindle and an intermediate housing, wherein the intermediate housing includes a first end connected to an internal surface of the spindle and a second end defining the internal engagement face of the spindle assembly.

13. The electric drive machine of claim 12, further including a sealing member positioned between the first end of the intermediate housing and the internal surface of the spindle.

14. The electric drive machine of claim 13, wherein the final drive assembly is positioned outward of the wheel assembly and includes a final drive planetary gear set.

15. The electric drive machine of claim 14, further including a support housing configured to receive an axle shaft therethrough and positioned between the motor housing and the final drive assembly.

* * * * *